United States Patent
Denha

(10) Patent No.: US 12,435,463 B2
(45) Date of Patent: Oct. 7, 2025

(54) LAUNDRY BASKET

(71) Applicant: Souhayla Denha, Bloomfield Hills, MI (US)

(72) Inventor: Souhayla Denha, Bloomfield Hills, MI (US)

( * ) Notice: Subject to any disclaimer, the term of this patent is extended or adjusted under 35 U.S.C. 154(b) by 6 days.

(21) Appl. No.: 18/622,915

(22) Filed: Mar. 30, 2024

(65) Prior Publication Data

US 2024/0318377 A1     Sep. 26, 2024

Related U.S. Application Data

(63) Continuation-in-part of application No. 15/953,497, filed on Apr. 16, 2018, now Pat. No. 11,976,413.

(51) Int. Cl.
| | | |
|---|---|---|
| *D06F 95/00* | (2006.01) | |
| *B65D 21/08* | (2006.01) | |
| *B65D 25/08* | (2006.01) | |

(52) U.S. Cl.
CPC ......... *D06F 95/002* (2013.01); *B65D 21/086* (2013.01); *B65D 25/08* (2013.01)

(58) Field of Classification Search
CPC ...... B65D 7/30; B65D 5/6667; B65D 21/086; B65D 25/08; B65D 25/06; B65D 25/30; D06F 95/002
See application file for complete search history.

(56) References Cited

U.S. PATENT DOCUMENTS

| | | | | | |
|---|---|---|---|---|---|
| 872,837 | A | * | 12/1907 | Mio ......................... | A21B 3/13 |
| | | | | | 249/DIG. 1 |
| 876,235 | A | * | 1/1908 | Quackenboss ........... | A01G 9/02 |
| | | | | | 220/8 |
| 958,857 | A | * | 5/1910 | Dennis ..................... | A47J 47/20 |
| | | | | | 99/449 |
| 1,005,998 | A | * | 10/1911 | Munchausen ........ | B65D 21/086 |
| | | | | | 220/8 |
| 3,232,439 | A | * | 2/1966 | Dahl, Jr. ................. | B42F 17/02 |
| | | | | | 220/8 |
| 3,887,102 | A | * | 6/1975 | Earley ................... | F25D 25/022 |
| | | | | | 220/8 |
| 5,016,772 | A | * | 5/1991 | Wilk .................... | B65D 21/086 |
| | | | | | 220/495.11 |
| 5,192,019 | A | * | 3/1993 | Meehan ................. | B65D 5/324 |
| | | | | | 229/101 |
| 5,829,591 | A | * | 11/1998 | Lyons .................. | B65D 21/086 |
| | | | | | 220/8 |

(Continued)

*Primary Examiner* — Kareen K Thomas
(74) *Attorney, Agent, or Firm* — NEXUS LAW PLLC

(57) ABSTRACT

A laundry basket includes a first basket portion having a pair of opposing first sidewalls being connected by a first rear wall and a first bottom wall. Each of the first sidewalls includes a proximal keyway therethrough and a distal keyway therethrough. The laundry basket further includes a second basket portion having a pair of opposing second sidewalls being connected by a second rear wall and a second bottom wall. Each of the second sidewalls includes a clip or tab extending from respective one of the second sidewalls. The first basket portion can be slidably interconnected with the second basket portion and adjusted between a collapsed configuration and an extended configuration. The clip or tab of each of the second sidewalls is configured to secure the laundry basket in the collapsed configuration and to secure the laundry basket in the extended configuration.

20 Claims, 8 Drawing Sheets

(56) References Cited

U.S. PATENT DOCUMENTS

| | | | | |
|---|---|---|---|---|
| 5,875,912 A * | 3/1999 | Hobson | ............... | B43M 99/008 |
| | | | | 220/636 |
| 6,786,514 B2 * | 9/2004 | Gledhill | .................... | G09F 3/04 |
| | | | | 446/379 |
| 7,281,616 B2 * | 10/2007 | Peterson | .............. | A45C 7/0031 |
| | | | | 220/8 |
| 7,464,827 B2 * | 12/2008 | Meissen | ............... | B65D 21/086 |
| | | | | 229/101 |
| 8,381,936 B1 | 2/2013 | Blake | | |
| 9,884,702 B1 * | 2/2018 | Burns | .................... | A63C 11/00 |
| 2008/0202976 A1 | 8/2008 | Burgess | | |
| 2015/0041352 A1 | 2/2015 | Huang | | |
| 2016/0176577 A1 | 6/2016 | Frankenberg | | |
| 2018/0371685 A1 | 12/2018 | Ausi | | |

* cited by examiner

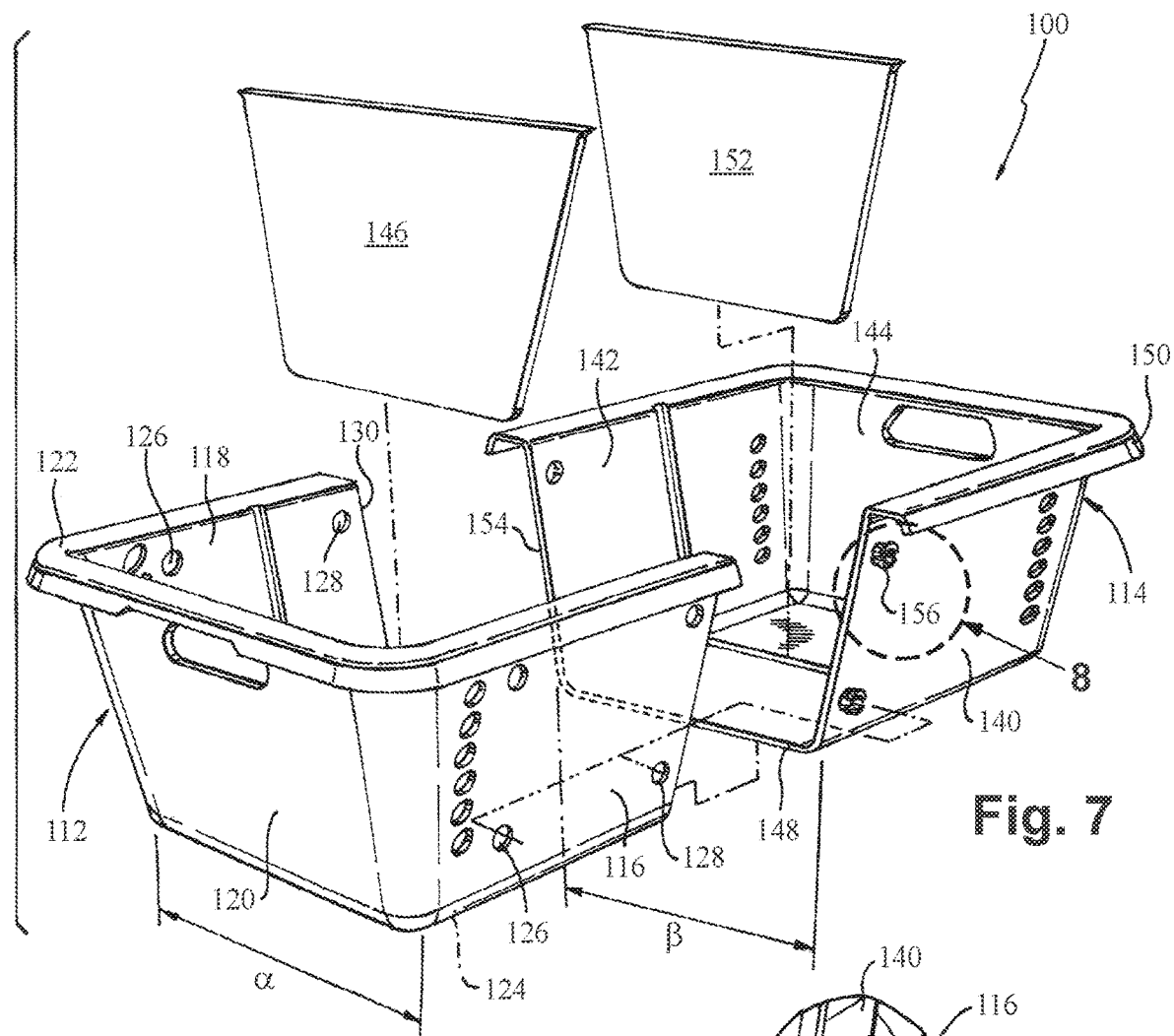
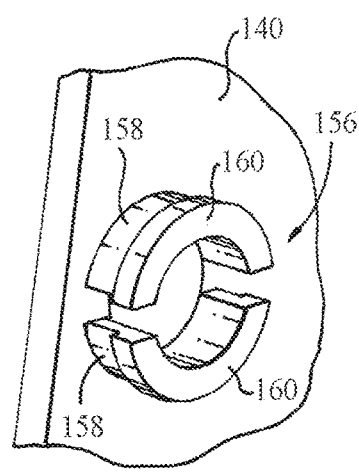
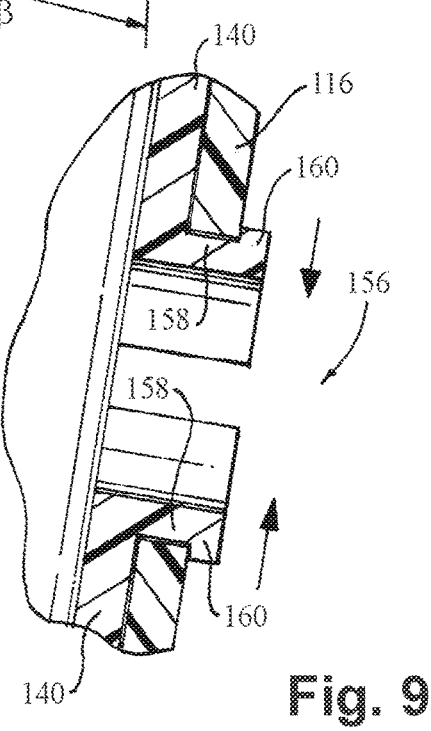
Fig. 7
Fig. 8
Fig. 9

LAUNDRY BASKET

CROSS REFERENCE TO RELATED APPLICATION

This application is a continuation-in-part of application Ser. No. 15/953,497, filed Apr. 16, 2018, which is hereby incorporated herein by reference in its entirety.

FIELD OF THE INVENTION

The present invention relates in general to a laundry basket, and more particularly to a size-adjustable laundry basket that can be used for carrying laundry, clothes, and various other items and laundry products.

BACKGROUND OF THE INVENTION

Consumers have been using traditional plastic-molded laundry baskets since time immemorial. These baskets typically come in all sizes and shapes based on consumers' personal preference. Presently, many people live in apartments, townhomes, or rental homes that may not be provided or equipped with a personal washing machine and/or a personal dryer.

These people periodically take a load of dirty laundry to a commercial laundry or a commercial laundromat for self-washing. In doing so, they stack their laundry baskets full of laundry or clothes, pile their boxes of detergent, fabric softener, bleach, etc. on top of the load and then struggle with a handful of coins or change. More often than desired, the person carrying the mountain of laundry and boxes manages to drop one or more items and while attempting to pick them up additional items may also fall.

The general idea of providing a laundry basket with receptacles or compartments for different types of clothing or to accommodate laundry products is not new. One prior art laundry basket, for example, includes a separate compartment for laundry products and another separate compartment for clothing. However, since these compartments are both contained in the context of a standard laundry basket, it offers reduced space for the clothing as well as marginally sufficient space for boxes of laundry products.

Therefore, there is a need for a size-adjustable laundry basket that can be selectively compartmentalized and extendable to accommodate larger laundry loads and provide for compartments to separate laundry and clothing from laundry products and other items.

SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description that follows.

The long-standing but heretofore unfulfilled need for a size-adjustable and compartmentalized laundry basket that overcomes the limitations of prior art laundry baskets is now met by a new, useful and non-obvious invention of the present disclosure. The present invention provides a size-adjustable laundry basket that can selectively extend to accommodate larger loads of laundry or clothes while providing separate compartments for other items and laundry products. Additionally, the laundry basket of the present invention has a quick release structure for a compartment divider panel to be easily attached and detached from the laundry basket of the present disclosure.

In one form of the present invention, the laundry basket includes two portions or halves, where one of the portions or halves extends into the other one to be able to be adjusted between an initial position and an adjusted position. Each portion or half includes side walls, a rear wall, a front wall, and a bottom including a plurality of openings. The rear wall and the front wall include handles defined therein for carrying the basket. The basket includes a divider wall inserted and secured by a pair of female connectors connected to and extending from the side walls. Each female connector includes a top portion connected and extending from each of the side walls, an extension portion extending perpendicular to the top portion and presenting a pocket portion defined by V-shaped neck portion with side edges spaced by an elongated slot adaptable to receive side ribs or extensions of the divider includes a pair of side terminal end each terminates to the side ribs.

The laundry basket can be formed from any material including and not limited to polymer, metal, wood, and combination thereof without limiting the scope of the present invention. The divider wall is adaptable to selectively separate the laundry basket between several positions wherein one position separates the laundry basket into two equal parts and a second position where the laundry basket is separated into two sections with one section being smaller than the second section and a third position wherein one of the sections is divided into two sections.

This laundry basket has been designed to solve many problems presently experienced by people who use commercial coin operated laundry facilities when washing their clothes. The basic structure of the laundry basket is preferably rectangular in shape. A divider panel has fastening structure on its side edges that mate with structure on the respective side walls of the basket and provide a quick release structure.

An advantage of the present invention is to provide a novel and improved laundry basket that provides a separate compartment for dirty laundry and laundry products. Another advantage of the present invention is to provide a novel and improved laundry basket that can expand into various lengths to accommodate storage and transportation of various loads of laundry and other articles. Still another advantage of the present invention is to provide a novel and improved laundry basket that has a quick release structure on the edges of a divider panel that allows it to be easily attached and detached from the basic laundry basket structure. Still another advantage of the invention is to provide an improved laundry basket that is easy and economical to manufacture and market.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is an exploded perspective view of the laundry basket of FIG. 1;

FIG. 8 is an enlarged view of the area designated as 8 in FIG. 7;

FIG. 9 is a cross-sectional view of the area of FIG. 8;

DETAILED DESCRIPTION OF THE INVENTION

Figure 1:
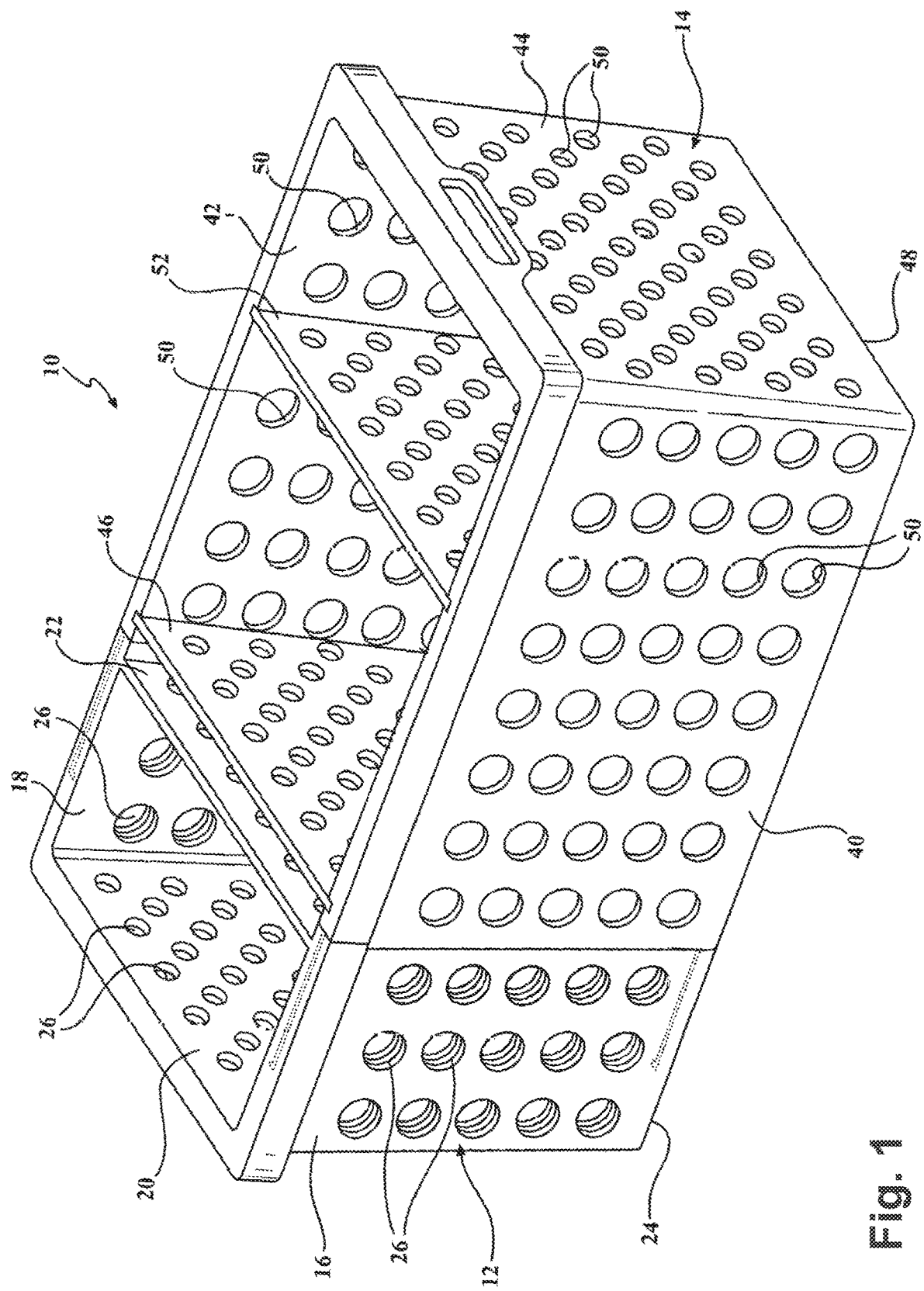
FIG. 1 is a perspective view of an adjustable laundry basket of the present invention in an initial position.
Figure 2:
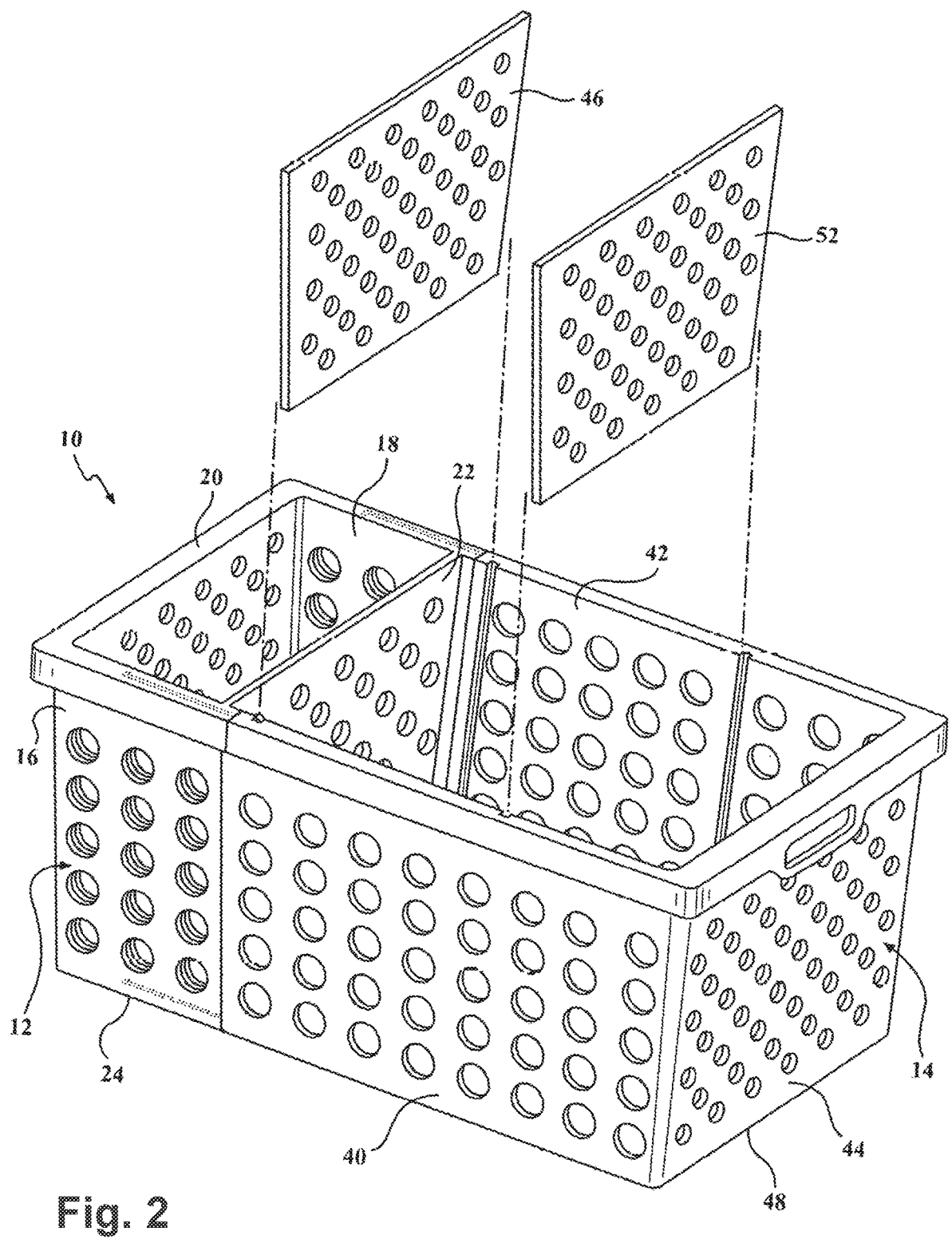
FIG. 2 is a perspective view of the adjustable laundry basket with dividers extended away from the adjustable laundry basket.
Figure 3:
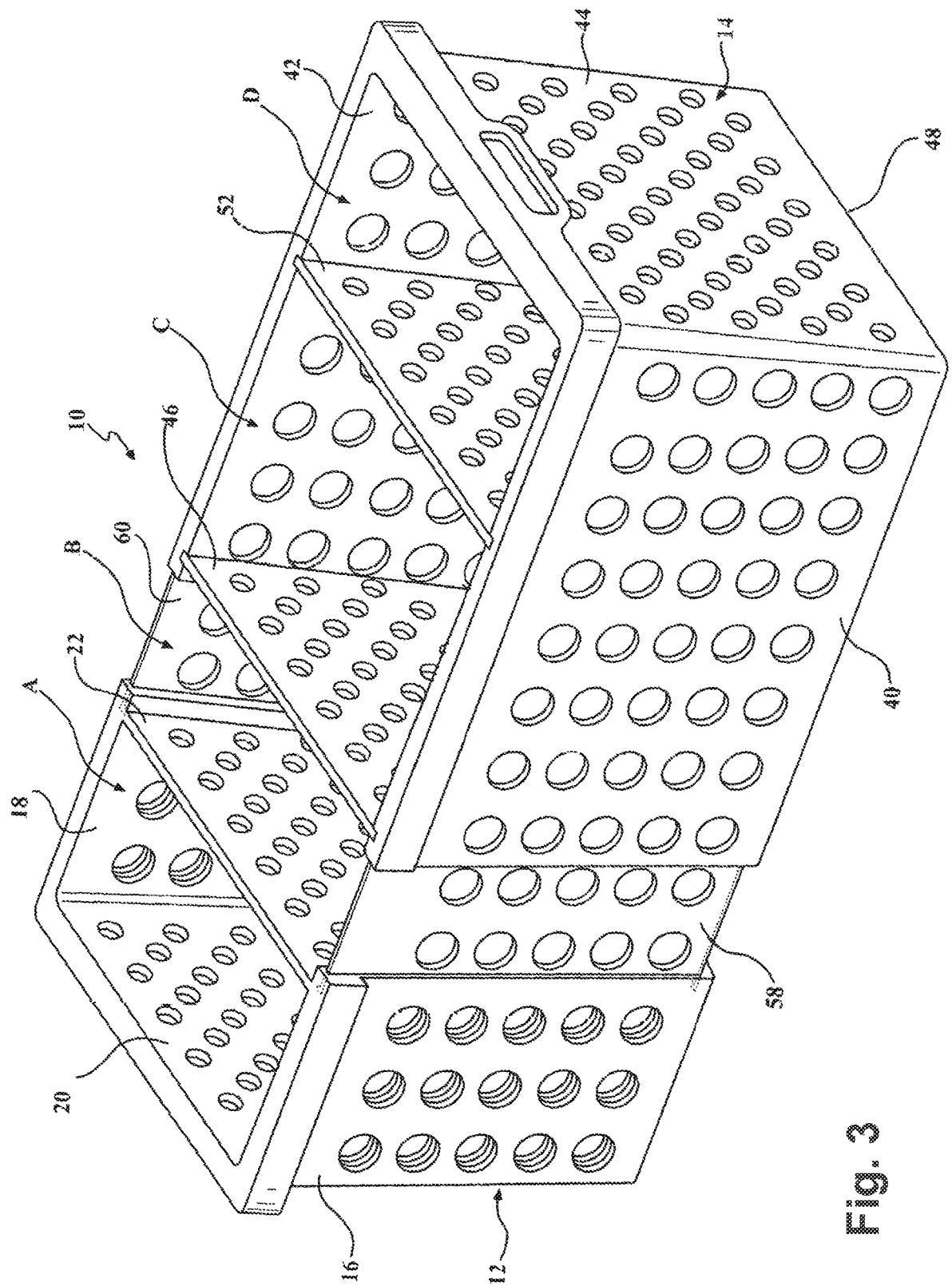
FIG. 3 is a perspective view of the adjustable laundry basket of the present invention in an adjusted position.

Referring to the Figures, wherein like numerals indicate like or corresponding parts, a laundry basket (the basket) of the present invention is generally shown at 10 in FIGS. 1 through 3. The basket 10 includes two portions or halves, generally indicated at 12 and 14. The half 12 is shorter in length that the other half 14. The halves 12 and 14 extends into one another and are adjusted between an initial position (shown in FIG. 1) and an adjusted position (shown in FIG. 3). The half 12 includes side walls 16, 18, a rear wall 20, a front wall 22, and a bottom 24. The side walls 16, 18, the rear wall 20, the front wall 22, and the bottom 24 include a plurality of openings 26. The front wall 22 extends between the side walls 16, 18. Alternatively, the front wall 22 maybe slidably inserted into grooves defined in each wall 16 and 18 (not shown). The side walls 16, 18 include internal channels 30 and 32 extending to respective keyways 34, 36 to be described further.

The half 14 includes side walls 40, 42, a rear wall 44, a front wall 46, defined by a divider, slidably movable away from the side walls 40, 42 and inserted thereto, and a bottom 48. The side walls 40, 42, the rear wall 44, the front wall 46, and the bottom 48 include a plurality of openings 50. The front wall 46 extends between the side walls 40, 42. The side walls 40, 42 include at least two grooves to receive the front wall 46, acting as a first divider, and a second divider 52.

Figure 5:
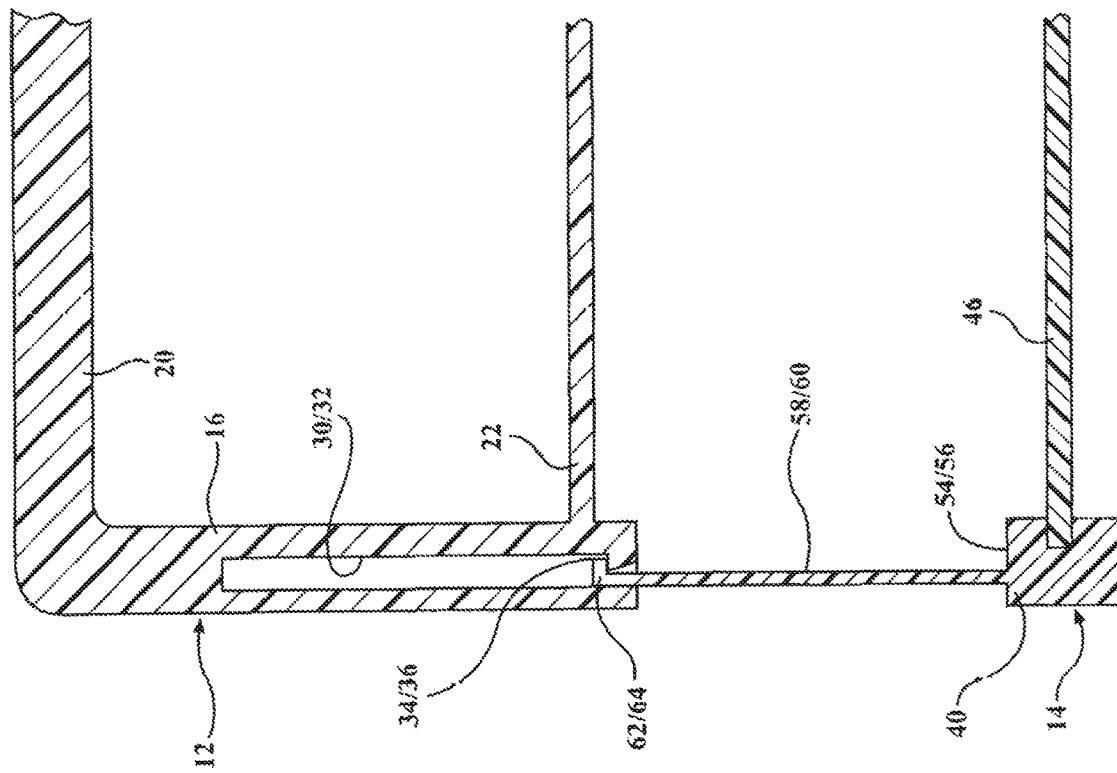
FIG. 5 is a partial cross-sectional view of the first half or portion of the basket and the second half or portion of the basket in the adjusted position.
Figure 4:
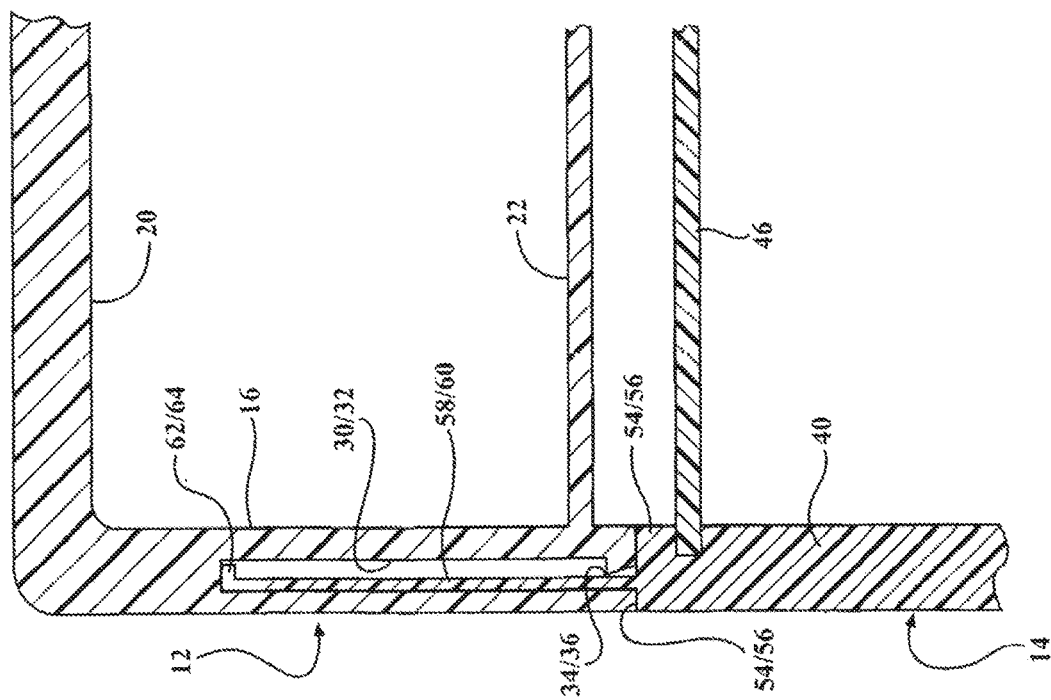
FIG. 4 is a partial cross-sectional view of a first half or portion of the basket and a second half or portion of the basket in the initial position.

As best shown in FIGS. 4 and 5, the side walls 40, 42 include terminal ends 54, 56 extending to inserting walls 58, 60 terminating to key portions 62, 64 to slidably movable inside the internal channels 30 and 32. The respective keyways 34, 36 act as stoppers and prevent the key portions 62, 64 to escape from the internal channels 30 and 32. The inserting walls 58, 60 slidably movable inside the internal channels 30 and 32 to allow the half 12 to extend to and from the half 14 at various distances.

As best shown in FIGS. 1 and 3, the basket 10 includes four sections, generally indicated at A, B, C, and D, as shown in FIG. 1. As the basket 10 is moved from the initial position, section B will change its size and can have the same size as the sections A, C, and D or can be longer than the sections A, C, and D, as shown in FIGS. 3 and 5. Alternatively, as shown in FIG. 2, the front wall 46, acting as the first divider, and the second divider 52 are now removed. Now, the basket will only have the section A and section E. The section A will remain the same and the section E may have various length as the half 12 extends away from the half 14.

The laundry basket 10 can be formed from any material including and not limited to polymer, metal, wood, and combination thereof without limiting the scope of the present invention.

An advantage of the present invention is to provide a novel improved laundry basket 10 that can expand into various lengths to accommodate storage and transportation of various loads of laundry and other articles.

Another advantage of the present invention is to provide a novel improved laundry basket 10 that provides a separate compartment for dirty laundry and washing products.

Another advantage of the present invention is to provide a novel improved laundry basket 10 that has a quick release structure on the edges of a divider panel that allows it to be easily attached and detached from the basic laundry basket structure.

Still another advantage of the invention to provide an improved novel laundry basket 10 that is economical to manufacture and market.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Although the laundry basket 10 provides a size-adjustable basket with separate and size-adjustable compartments, an alternative laundry basket 100, as shown in FIGS. 6-9, is envisioned within the scope of the present disclosure that is also capable of being size-adjustable and having varying sizes of separate compartments. Additionally, the laundry basket 100 is contemplated to be more structurally robust and simpler to manufacture as compared to the laundry basket 10.

In many respects this alternative laundry basket 100 is similar or nearly identical to the laundry basket 10 described above, such that the following discussion of the alternative laundry basket 100 will focus primarily on the differences between the laundry baskets 10 and 100. It will be appreciated that various regions and components of the laundry basket 100 that are substantially similar to regions and components of the laundry basket 10 are given like numerals by the addition of 100, such that the regions and components may be generally understood with reference to the above discussion.

Figure 6:
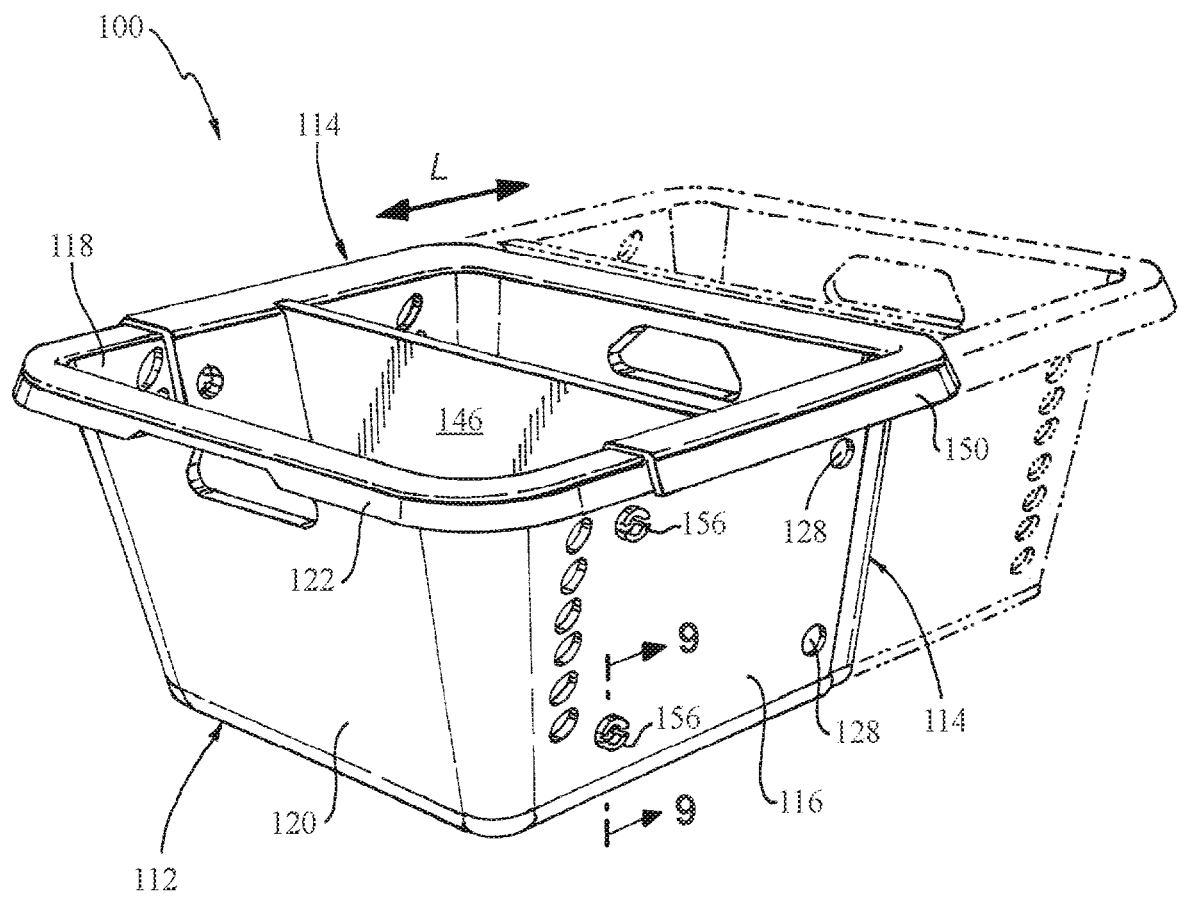
FIG. 6 is a perspective view of an alternative adjustable laundry basket in accordance with the present invention, shown in a collapsed configuration.

With reference to FIG. 6, the laundry basket 100 includes a first half 112 and a second half 114. The first half 112 has a width α and can be longitudinally shorter than, equal to, or longer than the second half 114. The first half 112 has opposing side walls 116, 118 being connected by a rear wall 120 and a bottom 124. The first half 112 further includes a first flange 122 outwardly extending from a top surface and around a perimeter of the side walls 116, 118 and rear wall 120, as best shown in FIG. 7. It is envisioned that the first flange 122 is curved towards the bottom 124. With continued reference to FIG. 7, each of the side walls 116 and 118 includes a proximal pair of keyways 126 therethrough and a distal pair of keyways 128 therethrough. The proximal pair of keyways 126 is disposed near the rear wall 120 and the distal pair of keyways 128 is disposed near a free end surface 130 of each of the side walls 116, 118.

The second half 114 has a width β and can be longitudinally shorter than, equal to, or longer than the first half 112. The second half 114 has opposing side walls 140, 142 being connected by a rear wall 144 and a bottom 148. The second half 114 further includes a second flange 150 outwardly extending from a top surface and around a perimeter of the side walls 140, 142 and rear wall 144, as best shown in FIG. 7. It is envisioned that the second flange 150 is curved towards the bottom 148. With continued reference to FIG. 7, each of the side walls 140 and 142 near a respective free end surface 154 includes a pair of locking members or clips 156 that are outwardly protruding from respective one of the side walls 140, 142. As can be best seen in FIGS. 8 and 9, each clip 156 includes a pair of semi-circular tabs 158 that are spaced a distance apart from one another. Each tab 158 includes a key flange 160 orthogonally extending from each tab 158. Each clip 156 is envisioned to be made of a generally rigid but flexible material.

As best shown in FIG. 6, the second half 114, having the width β that is narrower than the width α of the first half 112, can be slidably inserted into the first half 112 such that the second flange 150, which is generally larger than the first flange 122, is configured to overlay the first flange 122 and slide over and along the first flange 122 of the side walls 116, 118. Accordingly, the first flange 122 of the side walls 116, 118 is configured to serve as a guide rail for the second flange 150 of the side walls 140, 142 to move along when the second half 114 is slidably inserted into and out of the first half 112. By slidably inserting the second half 114 into and out of the first half 112, a longitudinal extent of the laundry basket 100 can be reduced or extended along direction L, such as shown in FIG. 6. To secure the laundry basket 100 in a reduced configuration, each pair of clips 156 along respective one of the side walls 140, 142 can be used to engage the respective proximal pair of keyways 126 along respective one of the side walls 116, 118, as shown in FIG. 6. It should be noted that the key flange 160 acts as a stopper preventing each clip 156 from freely disengaging or escaping from respective one of the proximal or distal keyways 126, 128.

With continued reference to FIG. 6, to expand the laundry basket 100 from the reduced configuration into an extended configuration, each clip 156 can be disengaged from respective one of the proximal keyways 126 by biasing or forcing the pair of semi-circular tabs 158 towards one another, along the arrows shown in FIG. 9. Once every clip 156 is disengaged, the second half 114 can be slid out of the first half 112 along direction L to expand the laundry basket 100. To secure the laundry basket 100 in the extended configuration, each pair of clips 156 along respective one of the side walls 140, 142 can be used to engage the respective distal pair of keyways 128 along respective one of the side walls 116, 118.

According to yet another embodiment of the present disclosure, an alternative laundry basket 200, as shown in FIGS. 10-13, is envisioned within the scope of the present disclosure that is also capable of being size-adjustable and having varying sizes of separate compartments.

In many respects the alternative laundry basket 200 is similar or nearly identical to the laundry basket 100 described above, such that the following discussion of the laundry basket 200 will focus primarily on the differences between the laundry baskets 100 and 200. It will be appreciated that various regions and components of the laundry basket 200 that are substantially similar to regions and components of the laundry basket 100 are given like numerals by the addition of 100, such that the regions and components may be generally understood with reference to the above discussion.

Figure 10:
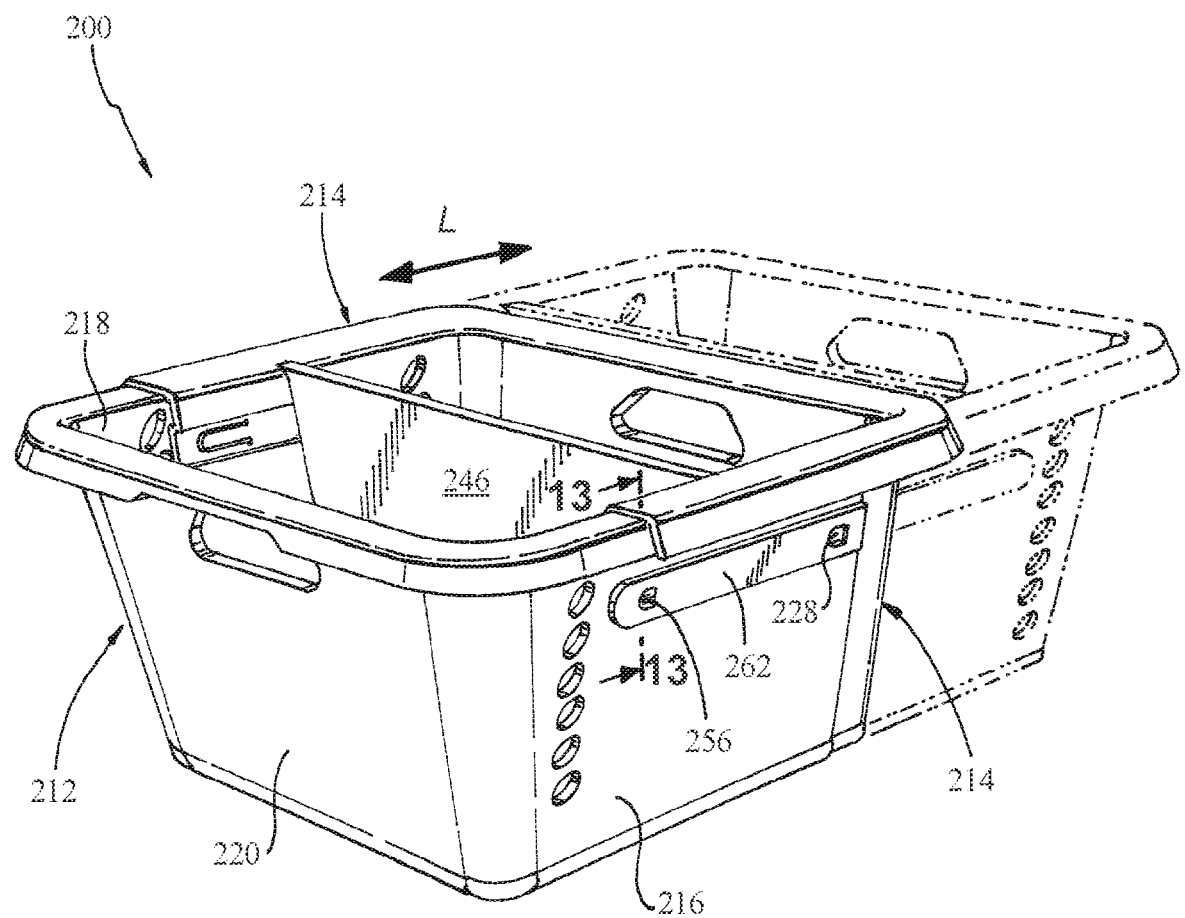
FIG. 10 is a perspective view of another alternative adjustable laundry basket in accordance with the present invention, shown in a collapsed configuration.

With reference to FIG. 10, the laundry basket 200 includes a first half 212 and a second half 214. The first half 212 has opposing side walls 216, 218 being connected by a rear wall 220 and a bottom 224. The second half 214 has opposing side walls 240, 242 being connected by a rear wall 244 and a bottom 248. Each side wall 216, 218 of the first half 212 includes a guiding channel 262 that extends from a free end surface 230 of each of the side walls 216, 218 towards the rear wall 220 and being generally parallel to a first flange 222 of the side walls 216, 218. Each guiding channel 262 outwardly protrudes from respective one of the side walls 216, 218. Further, each guiding channel 262 is generally hollow and includes a proximal keyway 226 therethrough and a distal keyway 228 therethrough, as can be best seen in FIG. 11.

Figure 11:
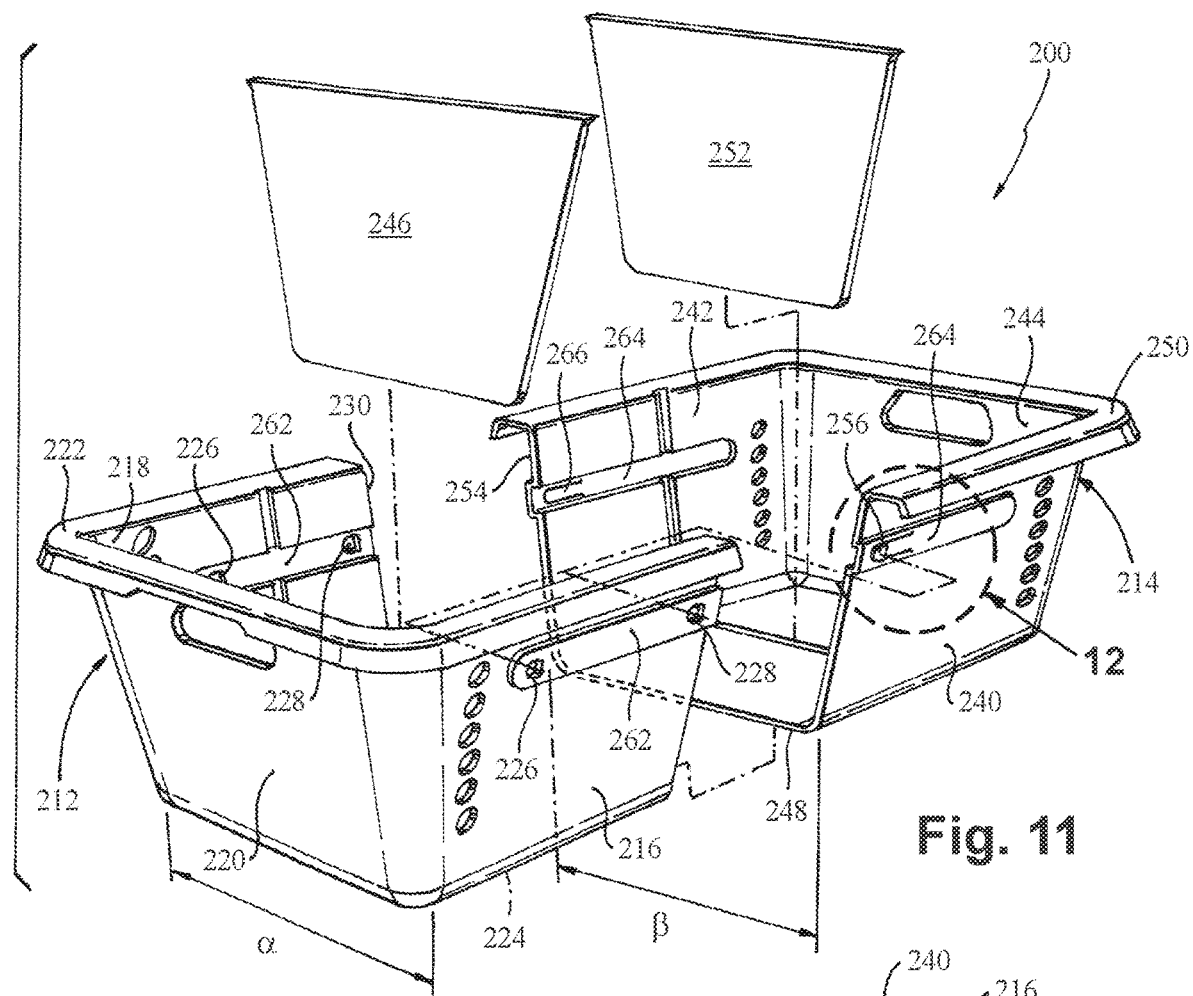
FIG. 11 is an exploded perspective view of the laundry basket of FIG. 10.
Figure 12:
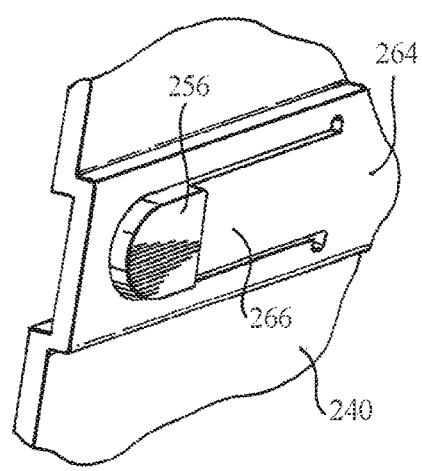
FIG. 12 is an enlarged view of the area designated as 12 in FIG. 11.
Figure 13:
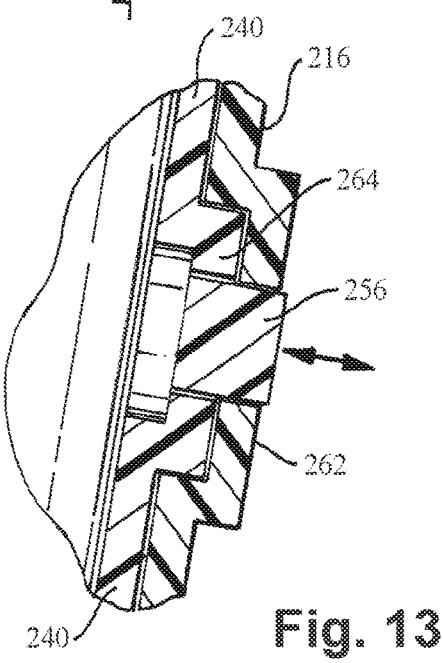
FIG. 13 is a cross-sectional view of the area of FIG. 12.

Turning now to FIG. 11, each side wall 240, 242 of the second half 214 includes a ridge 264 that extends from a free end surface 254 of each of the side walls 216, 218 towards the rear wall 244 and being generally parallel to a second flange 250 of the side walls 240, 242. As best shown in FIGS. 12 and 13, the ridge 264 outwardly protrudes from respective one of the side walls 240, 242 and has a generally similar length as a length of the guiding channel 262. It will be understood that when the second half 214 is slidably inserted into the first half 212, the guiding channel 262 is configured to align with and receive the ridge 264, such that the guiding channel 262 serves as a sheath for the ridge 264 when the first and second halves 212, 214 are interconnected.

With reference to FIG. 12, each ridge 264 includes a cut-out plate 266 therethrough, one side of which still being connected to respective one of the ridges 264, that can be inwardly biased and return or spring back to an original position, along a direction indicated by the double-headed arrow shown in FIG. 13. It will be understood that the original position of each plate 266 is generally flush with a top surface of respective one of the ridges 264. Each plate 266 includes a tab 256 that outwardly protrudes from respective one of the plates 266. Each tab 256 is disposed near the free end surface 254 of respective one of the side walls 216, 218.

As best shown in FIG. 10, the second half 214 can be slidably inserted into the first half 212 such that the second flange 250, which is generally larger than the first flange 222, is configured to overlay the first flange 222 and slide over and along the first flange 222 of the side walls 216, 218. By slidably inserting the second half 214 into and out of the first half 212, a longitudinal extent of the laundry basket 200 can be reduced or extended along direction L, such as shown in FIG. 10. To secure the laundry basket 200 in a reduced configuration, each tab 256 of respective one of the side walls 240, 242 can be used to engage the proximal keyway 226 of respective one of the side walls 216, 218, as shown in FIG. 10.

With continued reference to FIG. 10, to expand the laundry basket 200 from the reduced configuration into an extended configuration, each tab 256 can be disengaged from respective one of the proximal keyways 226 by inwardly biasing or forcing each tab 256. Once each tab 256 is disengaged, the second half 214 can be slid out of the first half 212 along direction L to expand the laundry basket 200. To secure the laundry basket 200 in the extended configuration, each tab 256 of respective one of the side walls 240, 242 can be used to engage respective one of the distal keyways 128 of respective one of the side walls 216, 218.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A laundry basket for holding and transporting laundry, the laundry basket comprising:
   a first basket portion having a pair of opposing first sidewalls being connected by a first rear wall and a first bottom wall, each of the first sidewalls having a first top surface defining a top opening of the first basket portion and a first free end surface defining a front opening of the first basket portion, wherein each of the first sidewalls includes a proximal keyway therethrough and a distal keyway therethrough, the proximal keyway of each of the first sidewalls being disposed near the first rear wall and the distal keyway of each of the first sidewalls being disposed near respective one of the first free end surface; and
   a second basket portion having a pair of opposing second sidewalls being connected by a second rear wall and a second bottom wall, each of the second sidewalls having a second top surface defining a top opening of the second basket portion and a second free end surface defining a front opening of the second basket portion, wherein each of the second sidewalls includes a clip connected to and extending from respective one of the second sidewalls, the clip of each of the second sidewalls being disposed near respective one of the second free end surface, wherein each clip outwardly extends from respective one of the second sidewalls and includes a pair of tabs that are spaced a distance apart from one another, and wherein each tab includes a key flange orthogonally extending therefrom;
   wherein the first basket portion can be slidably interconnected with the second basket portion to form the laundry basket that is expandable and collapsible between an extended configuration and a collapsed configuration; and
   wherein the clip of each of the second sidewalls is configured to engage respective one of the proximal keyways to secure the laundry basket in the collapsed configuration and engage respective one of the distal keyways to secure the laundry basket in the extended configuration.

2. The laundry basket of claim 1, wherein the first basket portion has a first width defined between the first sidewalls, wherein the second basket portion has a second width defined between the second sidewalls, and wherein the first width is wider than the second width allowing the first basket portion to slidably receive the second basket portion.

3. The laundry basket of claim 1, wherein the first top surface of the first sidewalls includes a first flange outwardly extending from the first top surface, and wherein the second top surface of the second sidewalls includes a second flange outwardly extending from the second top surface.

4. The laundry basket of claim 3, wherein the second flange is larger than the first flange, and wherein the second flange is configured to overlay the first flange and slide over and along the first flange when the laundry basket is shifted between the collapsed and extended configurations.

5. The laundry basket of claim 1, wherein the first sidewalls of the first basket portion include a first groove that is configured to removably receive a first divider wall, and wherein the second sidewalls of the second basket portion include a second groove that is configured to removably receive a second divider wall.

6. The laundry basket of claim 5, wherein the laundry basket can be in the collapsed configuration only when the first divider wall is removed.

7. The laundry basket of claim 1, wherein each tab and each key flange has a semi-circular shape, and wherein the pair of tabs of each clip are configured to be selectively biased towards one another.

8. The laundry basket of claim 7, wherein each key flange acts as a stopper preventing the clip from freely disengaging or escaping from respective one of the proximal or distal keyways.

9. The laundry basket of claim 1, wherein at least the pair of opposing first sidewalls and second sidewalls include a plurality of openings or perforations.

10. A laundry basket for holding and transporting laundry, the laundry basket comprising:
    a first basket portion having a pair of opposing first sidewalls being connected by a first rear wall and a first bottom wall, each of the first sidewalls having a first top surface defining a top opening of the first basket portion and a first free end surface defining a front opening of the first basket portion, wherein each of the first sidewalls includes a guiding channel, each guiding channel extending from the first free end surface of respective one of the first sidewalls towards the first rear wall and including a proximal keyway therethrough and a distal keyway therethrough, the proximal keyway of each guiding channel being disposed near the first rear wall and the distal keyway of each guiding channel being disposed near respective one of the first free end surface;
    a second basket portion having a pair of opposing second sidewalls being connected by a second rear wall and a second bottom wall, each of the second sidewalls having a second top surface defining a top opening of the second basket portion and a second free end surface defining a front opening of the second basket portion, wherein each of the second sidewalls includes a ridge extending from the second free end surface of respective one of the second sidewalls towards the second rear wall and including a flexible tab, and wherein the ridge is correspondingly shaped to be slidably inserted into respective one of the guiding channels of the first basket portion;
    wherein the first basket portion can be slidably interconnected with the second basket portion to form the laundry basket that is expandable and collapsible between an extended configuration and a collapsed configuration; and
    wherein the tab of each ridge is configured to engage respective one of the proximal keyways to secure the laundry basket in the collapsed configuration and engage respective one of the distal keyways to secure the laundry basket in the extended configuration.

11. The laundry basket of claim 10, wherein the first basket portion has a first width defined between the first sidewalls, wherein the second basket portion has a second width defined between the second sidewalls, and wherein the first width is wider than the second width allowing the first basket portion to slidably receive the second basket portion.

12. The laundry basket of claim 10, wherein each guiding channel is configured to align with and receive respective one of the ridges when the first basket portion is slidably interconnected with the second basket portion.

13. The laundry basket of claim 10, wherein each tab can be inwardly biased to disengage or escape from respective one of the proximal keyways or respective one of the distal keyways.

14. The laundry basket of claim 10, wherein the first top surface of the first sidewalls includes a first flange outwardly extending from the first top surface, and wherein the second top surface of the second sidewalls includes a second flange outwardly extending from the second top surface.

15. The laundry basket of claim 14, wherein each guiding channel extends along respective one of the first sidewalls in parallel to the first flange, and wherein each ridge extends along respective one of the second sidewalls in parallel to the second flange.

16. The laundry basket of claim 14, wherein the second flange is larger than the first flange, and wherein the second flange is configured to overlay the first flange and slide over and along the first flange when the laundry basket is shifted between the collapsed and extended configurations.

17. The laundry basket of claim 10, wherein the proximal keyway of each guiding channel is disposed near the first rear wall, wherein the distal keyway of each guiding channel is disposed near the first free end surface of respective one of the first sidewalls, and wherein a distance between each distal keyway and respective one of the first free end surfaces is smaller than a distance between each proximal keyway and the first rear wall.

18. The laundry basket of claim 10, wherein the tab of each ridge is disposed near the second free end surface of respective one of the second sidewalls.

19. The laundry basket of claim 10, wherein the first sidewalls of the first basket portion include a first groove that is configured to removably receive a first divider wall, and wherein the second sidewalls of the second basket portion include a second groove that is configured to removably receive a second divider wall.

20. The laundry basket of claim 19, wherein the laundry basket can be in the collapsed configuration only when the first divider wall is removed.

* * * * *